(12) United States Patent
Veggalam et al.

(10) Patent No.: US 11,295,315 B2
(45) Date of Patent: Apr. 5, 2022

(54) ACTIVE LISTENING USING ARTIFICIAL INTELLIGENCE FOR COMMUNICATIONS EVALUATION

(71) Applicant: T-Mobile USA, Inc., Bellevue, WA (US)

(72) Inventors: Vijay Veggalam, Morris Plains, NJ (US); Jonathan Silberlicht, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 172 days.

(21) Appl. No.: 16/685,467

(22) Filed: Nov. 15, 2019

(65) Prior Publication Data

US 2020/0160351 A1 May 21, 2020

Related U.S. Application Data

(60) Provisional application No. 62/768,758, filed on Nov. 16, 2018.

(51) Int. Cl.
  *G06Q 30/00* (2012.01)
  *H04M 3/51* (2006.01)
  *H04M 3/523* (2006.01)

(52) U.S. Cl.
  CPC ........ *G06Q 30/016* (2013.01); *H04M 3/5175* (2013.01); *H04M 3/5191* (2013.01); *H04M 3/5233* (2013.01)

(58) Field of Classification Search
  CPC .... G06Q 30/016; H04M 3/51; H04M 3/5175; H04M 3/5191; H04M 3/5233
  (Continued)

(56) References Cited

U.S. PATENT DOCUMENTS 6,038,544 A * 3/2000 Machin .......... G06Q 10/063112
  705/7.14
6,724,887 B1 * 4/2004 Eilbacher ............ H04M 3/5183
  379/265.02
(Continued)

OTHER PUBLICATIONS

5 Components of Active Listening. Institute of Chartered Accountants of Scotland (ICAS), Feb. 10, 2019 [online], [retrieved on Apr. 3, 2020 from Archive.org]. Retreived from the Internet: URL: https://web.archive.org/web/20190210010509/https://www.icas.com/professional-development/5-components-of-active-listening.
(Continued)

*Primary Examiner* — Harry S Hong
(74) *Attorney, Agent, or Firm* — Han Santos, PLLC

(57) ABSTRACT

Techniques are described herein for evaluating customer support sessions to identify active listening. The techniques include receiving a recording of a customer service support session from a customer support terminal, which is associated with a representative identifier of a customer service representative. The customer service support session includes one or more segments, and a plurality of active listening factor scores is calculated and averaged to determine an active listening factor score for each of the one or more segments. The plurality of active listening factor scores corresponds to different active listening attributes demonstrated by the customer service representative. The active listening factor score for each of the one or more segments are averaged to determine a session score, which is associated with the representative identifier. The session score can be used to present one or more support suggestions for the customer service representative in a support tool.

20 Claims, 5 Drawing Sheets

(58) Field of Classification Search
USPC .................. 379/265.06, 265.07; 705/304
See application file for complete search history.

(56) References Cited

U.S. PATENT DOCUMENTS

| | | | | |
|---|---|---|---|---|
| 6,970,831 | B1* | 11/2005 | Anderson | G06Q 10/06398 |
| | | | | 705/7.32 |
| 9,165,556 | B1* | 10/2015 | Sugar | G10L 15/00 |
| 10,616,413 | B1* | 4/2020 | Vyas | H04M 3/2227 |
| 2006/0224437 | A1* | 10/2006 | Gupta | G06Q 10/06 |
| | | | | 705/7.32 |
| 2006/0233121 | A1* | 10/2006 | Cooper | H04M 3/5175 |
| | | | | 370/261 |
| 2007/0274502 | A1* | 11/2007 | Brown | H04M 3/5175 |
| | | | | 379/265.01 |
| 2008/0152122 | A1* | 6/2008 | Idan | H04M 3/5175 |
| | | | | 379/265.07 |
| 2012/0039460 | A1* | 2/2012 | Krishnapuram | H04M 3/5175 |
| | | | | 379/265.07 |
| 2013/0142322 | A1* | 6/2013 | Grasso | G06Q 10/06398 |
| | | | | 379/265.08 |
| 2018/0261219 | A1* | 9/2018 | Brooks | G10L 25/48 |
| 2021/0019339 | A1* | 1/2021 | Ghulati | G06Q 50/00 |

OTHER PUBLICATIONS

Doyle et al. Learn About Active Listening Skills With Examples. The Balance Careers, Oct. 24, 2018 [online], [retrieved on Nov. 15, 2019 from Archive.org]. Retrieved from the Internet: URL: https://www.thebalancecareers.com/active-listening-skills-with-examples-2059684.

* cited by examiner

ACTIVE LISTENING USING ARTIFICIAL INTELLIGENCE FOR COMMUNICATIONS EVALUATION

CROSS REFERENCE TO RELATED APPLICATION

This application claims priority to a commonly owned U.S. Provisional Patent Application No. 62/768,758 filed on Nov. 16, 2018, and titled "Active Listening Using Artificial Intelligence for Communications Evaluation," which is herein incorporated by reference in its entirety.

BACKGROUND

In customer support and service environment, a multitude of customer support calls relating to a wide range of service issues may be addressed at any given time. With such a wide range of service issues that need to be addressed, a customer support representative must be able to address each of the support calls. When a customer calls or chats with a customer care department of a wireless telecommunication carrier regarding a service issue, a customer support representative may work with the customer to resolve the issue. Even for what may be seemingly straightforward solutions, the support representative needs to spend time with the customer to correctly identify the problem.

Communications between support representatives and customers may be evaluated to perform training and to ensure quality customer service. Generally, randomly selected recordings of customer support sessions may be manually evaluated by trainers and quality assurance personnel. Because the process for evaluating customer support sessions is largely a manual process that can be time-consuming, customer sessions may be evaluated only on a limited basis.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
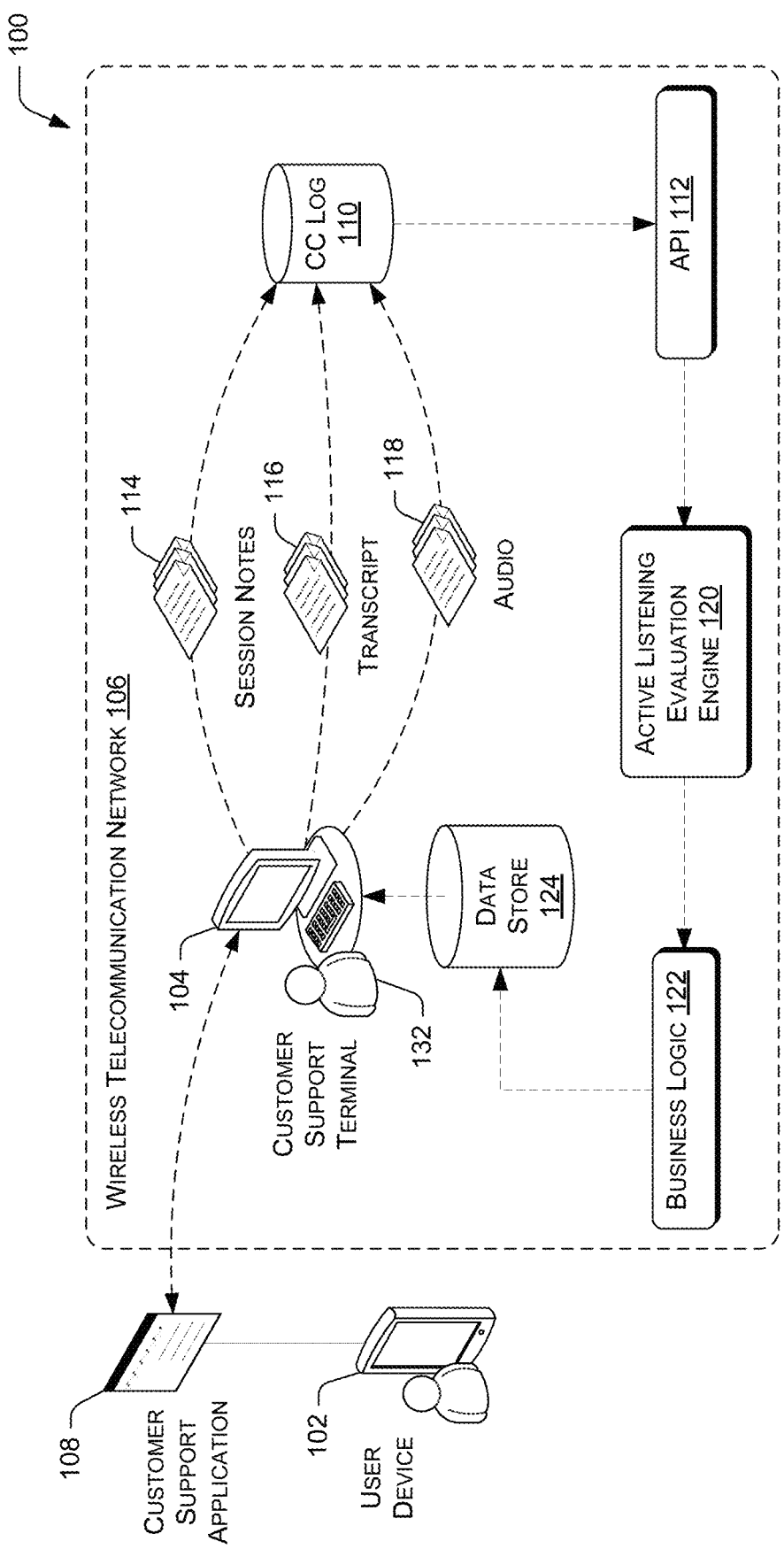
FIG. 1 illustrates an example network architecture for evaluating customer support sessions to identify active listening.

This disclosure is directed to techniques for evaluating customer support sessions to score active listening for individual customer service representatives. Customers or subscribers of a telecommunications service provider may contact customer service by telephone or by an online chat application to initiate a customer support session. Audio recordings or a written transcript of the customer support session may be made up of one or more segments. In one example, the segments may be identified using speaker diarization techniques. The individual segments may be analyzed via an active listening evaluation engine to determine a plurality of active listening factor scores based on scoring models, which may correspond to different active listening attributes based on active listening data associated with the customer service representative during the customer support session. The plurality of active listening factor scores can be averaged to determine segment scores for the individual segments. The segment scores can be averaged to determine the overall session score. In some aspects, the active listening data and/or the scores may be used to generate customer service support metrics corresponding to the different active listening attributes and to generate a customized training model for the customer service representative to increase session scores of subsequent customer service support sessions.

Based at least on the session score, the active listening evaluation engine may determine whether the customer service representative is demonstrating active listening during the support session. In some aspects, the active listening evaluation engine may implement machine learning techniques by applying active listening evaluation models to detect active listening attributes. In response to determining that the customer service representative is not demonstrating active listening, the active listening evaluation engine may present suggestions and/or prompts in a support tool. The suggestions and/or prompts may be based at least on one or more policies and/or knowledge objects of a business entity.

For example, the active listening evaluation engine may prompt a customer service representative to restate a subscriber's question to ensure that the customer service representative understands the question correctly. Additionally, or alternatively, the active listening evaluation engine may identify triggering events during the support session to provide one or more support suggestions to a customer service representative. The triggering events may be an event that indicates a subscriber is dissatisfied or a customer service representative is not performing active listening. For instance, the active listening evaluation engine may recommend that the customer service representative apologize, use an empathetic tone, and/or offer a promotion (e.g., based at least on a marketing campaign) if the subscriber indicates dissatisfaction or the subscriber requests assistance from an additional customer service representative.

The techniques described herein may be implemented in a number of ways. Example implementations are provided below with reference to the following figures.

Example Network Architecture

FIG. 1 illustrates example architecture for evaluating customer support sessions to identify active listening. The architecture may include a wireless telecommunication network 106 that is operated by a telecommunications service provider. The wireless telecommunication network 106 may provide a wide range of mobile communication services, as well as ancillary services and features to subscribers and associated mobile device users. In various embodiments, the wireless telecommunication network 106 may provide wireless communication between multiple user devices. Further, the wireless telecommunication network 106 may also provide communications between the multiple user devices and other user devices that are serviced by other telecommunication networks. For the purpose of simplicity, one user device 102 is provided in FIG. 1, but any number of user devices may be implemented, depending upon embodiments. The user device 102 may include mobile handsets, smartphones, tablet computers, personal digital assistants (PDAs), smartwatches, and/or other electronic devices having a wireless communication function that is capable of receiving input, processing the input, and generating output data.

The user device 102 can communicate with an access network (e.g., a radio access network (RAN), an access point (AP), etc.) over a physical communications interface or network access technologies. For example, the air interface may serve the user device 102 over a local wireless connection. The air interface can comply with a given cellular communications protocol. For example, the network can implement 2G, 3G, 4G, 5G, LTE, LTE advanced, high-speed data packet access (HSDPA), evolved high-speed packet access (HSPA+), UMTS, code-division multiple access (CDMA), GSM, a local area network (LAN), a wide area network (WAN), and/or a collection of networks (e.g., the Internet). The air interface 108 can also comply with a wireless IP protocol (e.g., Wi-Fi, IEEE 802.11).

The RAN can include a plurality of APs that serve the user device 102 over air interface. The APs can serve a respective coverage cell (e.g., microcell, femtocell, picocell, etc.). In one aspect, an AP in the RAN can be referred to as an access node (AN), a base station, Node B, evolved Node B (eNode B), and/or so forth. An AP can alternatively be a terrestrial access point or a satellite access point. The RAN connects to a core network that can perform a variety of functions, including bridging circuit-switched calls between mobile devices served by the RAN and other mobile devices served by the RAN or a different RAN. The RAN can also mediate an exchange of packet-switched (PS) data with external networks such as the Internet. The Internet can include any number of routing agents and processing agents.

The core network can provide one or more communications services (e.g., voice-over-Internet Protocol [VoIP] sessions, push-to-talk [PTT] sessions, group communication sessions, etc.) for user device 102, and/or so forth. The user device 102 can connect to the core network via the RAN and/or the Internet. Other mechanisms of connecting to the core network are also possible for the user device 102, such as over wired access networks, Wi-Fi networks (e.g., based on IEEE 802.11, etc.), and so on.

The wireless telecommunication network 106 may include a customer support terminal 104 that may include a customer support tool. The support tool may provide an interface for interacting with a subscriber, requesting and receiving information from a subscriber, sending information to a subscriber, generating notes, and/or so forth. The customer support terminal 104 is operated by a customer service representative of a telecommunications service provider (i.e., internal customer service representatives) or a third party (i.e., external customer service representatives). An internal customer support representative may be an employee or contractor that works directly for the wireless telecommunication carrier that operates the wireless telecommunication network. An external customer support representative may be a third-party vendor, a third-party contractor, a crowd-sourced expert, and/or so forth that do not work directly for the wireless telecommunication carrier. The customer service representative may be one of the customer support teams deployed by the telecommunications service provider that operates the network 106. A customer support team may include a cohort of customer service representatives that are split into multiple groups. Each of the multiple groups may cover a particular shift, a particular location, a particular issue or a complaint, and/or so forth. Additionally, a customer support representative may be located at one of multiple locations. The locations may include a call center of the wireless telecommunication carrier, a physical retail store that is operated by the wireless telecommunication carrier, a remote third-party location, and/or so forth.

The subscriber operating the user device 102 can communicate with the customer service representative at the customer support terminal 104 via the customer support application 108. The customer support application 108 may reside at least partially at the user device 102. The customer support application 108 may include a graphical user interface (GUI) to enable the subscriber to provide information about the subscriber and request assistance from a customer support representative.

The customer support application 108 may provide a voice over phone service or voice over Internet Protocol (IP) (i.e., telephone calls) by placing a telephone support call to a customer care phone number of the telecommunications service network. The customer support application 108 may include a chat component to initiate a support chat session request. The chat component may be implemented using various protocols, such as the Session Initiation Protocol (SIP), SIP Instant Messaging and Presence Leveraging Extensions (SIMPLE), Application Exchange (APEX), Instant Messaging and Presence Protocol (IMPP), Extensible Messaging and Presence Protocol (XMPP), or other messaging protocols. The telephone calls and the online chat session messages over the customer chat application 114 may be routed to the customer support terminal 104 via various customer communication routing functions and protocols of the wireless telecommunication network.

In some aspects, the chat component may include a chatbot that is configured to engage in a conversation with the subscriber. The chatbot may implement a support communications engine that prompts the subscriber to provide a service issue in the form of a text message that describes the wireless telecommunication service problem encountered by the subscriber. Additionally, the chatbot may implement a conversation engine for engaging in a conversation with the subscriber by natural language processing—that is, translating a subscriber request (e.g., a subscriber's question) and processing the request to generate an appropriate response in accordance with the request. It is contemplated that various types of machine learning (ML) algorithms/deep learning (DL) algorithms through supervised and unsupervised learning can also be applied to learn new patterns of subscriber's requests and responses that can be understood by both humans and machines over time.

The customer service representative at the customer support terminal 104 may generate a report or a memo that includes session notes 114 for each support session. The session notes 114 include service issues addressed during each customer support session, notes or memos generated during each customer support session, questions asked to the subscriber, possible root causes or diagnosis related to the service issues, potential solutions implemented to resolve the service issues, including any tests and procedures performed, outcomes of the solutions implemented, problem resolution history, and/or other information. In some embodiments, session notes 114 may include information from multiple individual support sessions, as well as subsequent notes or memos input by multiple customer support representatives. The session notes 114 may further include contextual information and data from external sources. Following the end of the support session, the customer support terminal 104 may forward the session notes 114 to the customer call (CC) log or a customer database. In this way, the session notes 114 can be accessed at a later time if the customer contacts a customer support representative 132 in the future with a similar service issue.

In some aspects, the customer support terminal 104 may also provide a recording or a transcript 116 of a support session. The transcript 116 may be a written transcript of a telephone conversation or a written conversation of a chat session between a subscriber and a customer service representative. The transcript 116 may also be a live-transcript or a transcript of a support session that ended. Additionally, the customer support terminal 104 may provide audio information 118, which can be a live-stream of a telephone conversation or an audio recording of a telephone conversation.

The session notes 114, the transcript 116, and the audio information 118 can be stored at the CC log 110. The CC log 110 can also include call metadata, recordings, and/or other such information related to the support session. For example, the CC log 110 may include subscriber information such as account information, device information, billing information, and/or so forth. The CC log 110 can be generated and accessed via a data management layer that includes software utilities for facilitating the acquisition, processing, storing, reporting, and analysis of data from multiple data sources such as the customer support terminal 104 or another third-party database that can store context information, and/or so forth. In various embodiments, the data management layer of the CC log 110 can interface with one or more APIs 112 of at least one software component.

The components may include components for converting speech to text, translating languages, and performing speaker diarization using active listening data from the transcript 116 or the audio information 118. The active listening evaluation engine 120 may determine active listening factor scores and overall session scores that are indicative of the level of active listening demonstrated by a customer service representative during a support session. In some aspects, the active listening evaluation engine 120 may implement one or more active listening evaluation models to determine whether the customer service representative demonstrated active listening. The scores may be calculated based at least on one or more scoring models. Additionally, the active listening evaluation engine 120 may provide suggestions or prompts to the customer service representative during the support session based at least on one or more policies or knowledge objects of a telecommunications service provider. In one example, one or more policies may include issue escalation policies, account credit policies, and/or so forth. The scores may also be associated with the customer service representative and the active listening data used to calculate the scores may be used to generate metrics for training the customer service representative. The scoring models, the knowledge objects, and the policies may be stored in the business logic 122. In some embodiments, the business logic 122 is operatively connected to at least one data store 124. The data store 124 may be a distributed storage system, in which data may be stored for long periods and replicated to guarantee reliability. The data store 124 may store support suggestions and related information.

The software components that are accessible via the APIs 112, the active listening evaluation engine 120, and the business logic 122 may execute on one or more computing devices. The computing devices may include general-purpose computers, such as desktop computers, tablet computers, laptop computers, servers, or other electronic devices that can receive input, process the input, and generate output data. The computing devices can include a plurality of physical machines that may be grouped and presented as a single computing system. Each physical machine of the plurality of physical machines may comprise a node in a cluster. The computing devices may also be in the form of virtual machines, such as virtual engines (VE) and virtual private servers (VPS).

Figure 2:
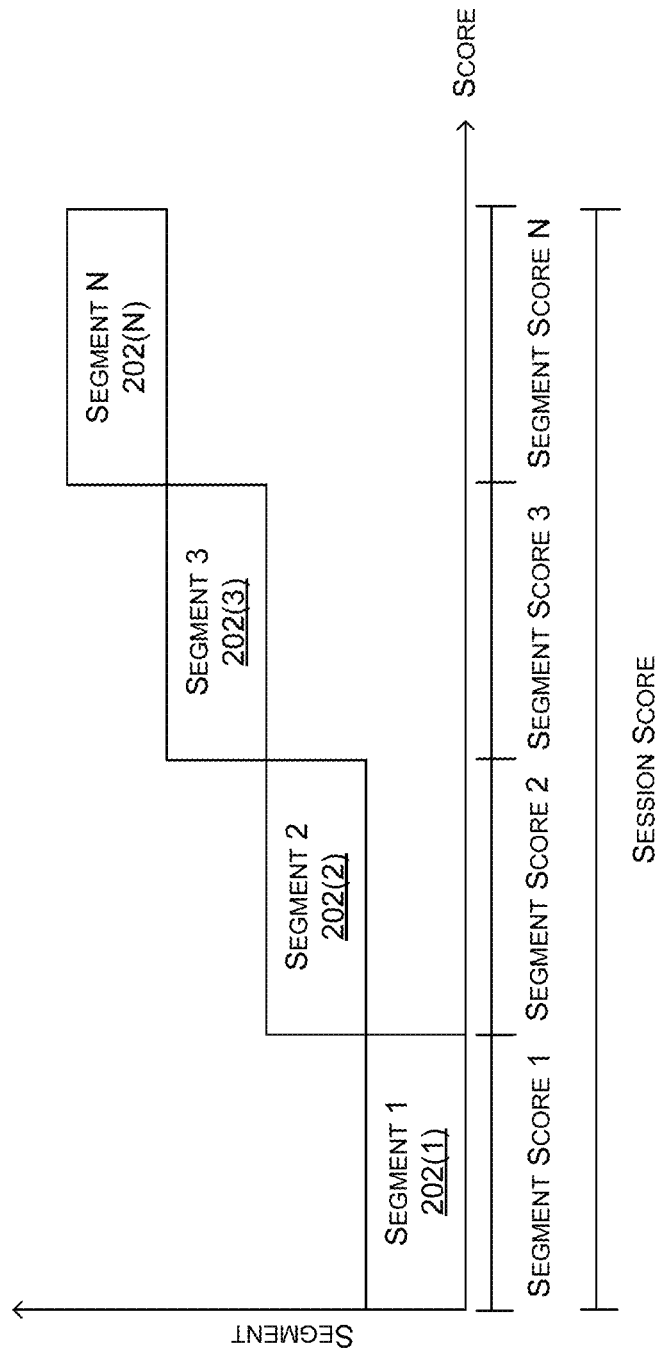
FIG. 2 illustrates a block diagram showing individual segments associated with a segment score that make up a session score over a customer support session.

FIG. 2 illustrates a block diagram showing individual segments associated with a segment score that make up a session score over a customer support session. A session comprises one or more segments. Each segment is associated with a segment score. The segment score may be made up of a plurality of active listening factor scores. The plurality of active listening factor scores may comprise an active listening factor score for sentiment (i.e., a sentiment score), an active listening factor score for tone (i.e., a tone score), and an active listening factor score for emotion (i.e., an emotion score). The active listening factor scores may correspond to different active listening attributes demonstrated by a customer service representative during a customer support session. The active listening evaluation engine may use weights as part of the calculation method for the individual segment scores and the overall session score. Weights may be defined as a set of relative values. By default, all weights may be distributed evenly. For example, the active listening factor scores for sentiment, tone, and emotion may be equally distributed. Additionally, or alternatively, the active listening evaluation engine may modify the weights to give certain attributes higher weight than others based on training goals. For instance, the active listening factor score for tone may be weighed more heavily than the active listening factor score for emotion.

In one example, the active listening factor scores of the first segment 202(1) are averaged to determine an active listening factor score, or the first segment score. This process is repeated by calculating the average of the active listening factor scores for the subsequent segments 202(2)-202(N) to determine the second segment score, the third segment score, and so on. The plurality of active listening factor scores of the subsequent segments 202(2)-202(N) is based at least on the weights defined for the plurality of active listening factor scores of the first segment 202(1). The individual segment scores are averaged to determine the session score. In some aspects, various algorithms and scoring mechanisms may be implemented to determine the segment scores and the session score.

Example Computing Device Components

Figure 3:
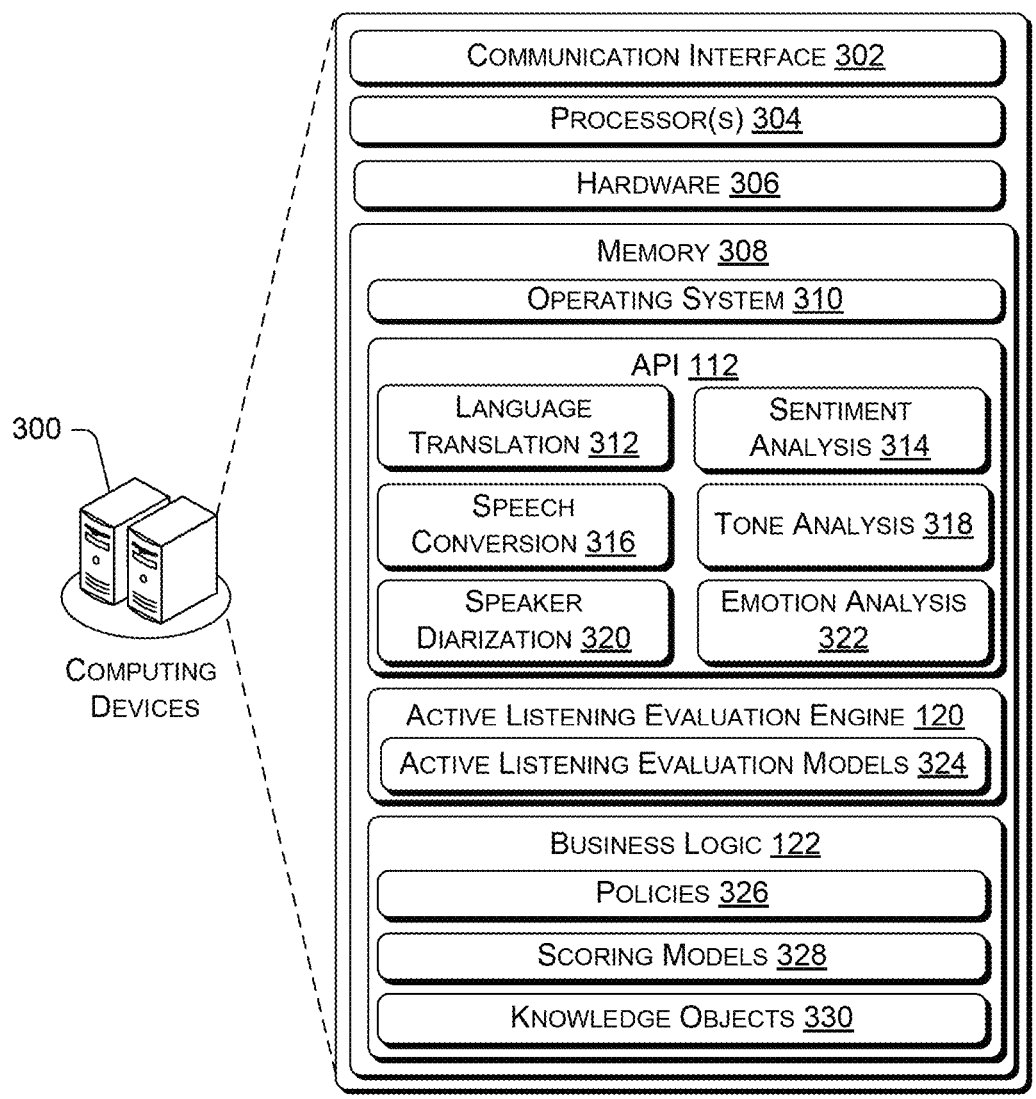
FIG. 3 is a block diagram showing various components of an illustrative computing device that implements automated customer support session evaluation.

FIG. 3 is a block diagram showing various components of illustrative computing devices, wherein the computing devices can comprise an active listening evaluation engine. It is noted that the computing devices as described herein can operate with more or fewer of the components shown herein. Additionally, the computing devices as shown herein or portions thereof can serve as a representation of one or more of the computing devices of the present system.

The computing devices 300 may include a communication interface 302, one or more processors 304, hardware 306, and memory 308. The communication interface 302 may include wireless and/or wired communication components that enable the computing devices 300 to transmit data to and receive data from other networked devices. In at least one example, the one or more processors 304 may be a central processing unit(s) (CPU), graphics processing unit(s) (GPU), both a CPU and GPU or any other sort of processing unit(s). Each of the one or more processors 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processors 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the computing devices 300.

The memory 308 of the computing devices 300 may include an operating system 310, software components that are accessible via the APIs 112, the active listening evaluation engine 120, and the business logic 122. Generally, these components may be a set of computer-executable instructions stored together as a discrete whole. For example, software components may include binary executables such as static libraries, dynamically linked libraries, executable programs, interpreted executables that are executed on a runtime such as servlets, applets, p-Code binaries, and JAVA binaries. Software components may run in kernel mode, user mode, or a combination of both. The operating system 310 may include components that enable the computing devices 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The operating system 310 may be used to implement the software components that are accessible via the APIs 112, the active listening evaluation engine 120, and the business logic 122. The software components comprise a language translation component 312, a sentiment analysis component 314, a speech conversion component 316, a tone analysis component 318, a speaker diarization component 320, and an emotion analysis component 322. The APIs 112 may be configured to obtain the transcript 116 or the audio information 118 from a CC log. In one example, the transcript 116 or the audio information 118 may be obtained contemporaneously during a support session or after a support session. Thus, the transcript 116 or the audio information 118 are received and are evaluated either in-stream or stored for evaluation. The language translation component 312 may utilize various natural language processing (NLP) algorithms for processing the transcript 116 or the audio information 118 of a conversation between a subscriber and a customer service representative during a support session to translate the transcript 116 or the audio information 118 from a first language to a second language.

In the latter case, the speech conversion component 316 may utilize NLP algorithms to determine raw texts corresponding to the audio information 118. For example, the speech conversion component 316 can apply an acoustic model (e.g., Viterbi Model, Hidden Markov Model [HMM], K-Nearest Neighbors [KNN], Support Vector Machines [SVM], Logic Regressions, Gaussian Mixtures Model [GMM], Artificial Neural Network [ANN], etc.) that is trained to represent the relationship between speech and phonemes or other linguistic units that make up the speech, thus relating the audio to a word or a phrase. The speech conversion component 316 may also apply the acoustic model to determine the start and end for each phoneme in the audio. Additionally, the speech conversion component 316 may compare the detected word or phrase with other known words or phrases, map the written representations and the pronunciations of words or phrases, and/or determine the probability of correctly detected words or phrases.

The language translation component 312 may translate whole words or phrases from a first language to a second language. The language translation component 312 may leverage context information from the session notes 114 to provide translations in context and colloquial translations. In some aspects, the language translation component 312 may utilize statistical machine translation (SMT) or neural machine translation (NMT), in which the latter predicts the likelihood of a sequence of words by modeling entire sentences or phrases in a single integrated model.

The speaker diarization component 320 is configured to partition an input audio stream into homogeneous segments according to the speaker identity (i.e., a subscriber or a customer service representative) by implementing speaker segmentation and speaker clustering. More particularly, the speaker segmentation identifies speaker change points in an audio stream and the speaker clustering groups together speech segments based on speaker characteristics. Various types of models such as GMM may be used to model each of the speakers, and assign the corresponding frames for each speaker such as HMM. Various types of clustering algorithms (e.g., K-Means Algorithm, a Gaussian Mixture Algorithm, a Bisecting K-Means Algorithm, a Streaming K-Means Algorithm, etc.) may be implemented. In one example, a Bottom-Up algorithm splits the full audio content in a succession of clusters and progressively tries to merge the redundant clusters to reach a situation where each cluster corresponds to a speaker. In another example, a Top-Down algorithm begins with a single cluster for all audio data and splits the cluster iteratively until reaching a number of clusters equal to the number of speakers. In this way, the speaker diarization component 320 structures the audio stream into the speaker turns and can be used together with a speaker recognition component to provide the speaker's true identity.

The tone analysis component 318 may be configured to analyze a subscriber's voice tone and a customer service representative's voice tone by analyzing a representation of speech for each speaker during a support session in a speech waveform. The tone analysis component 318 may detect changes in the intensity of the speech waveform over time. The tone analysis component 318 may utilize extraction algorithms to extract certain characteristics of the waveform that may be indicative of certain features such as tone to train a machine learning model. Various types of machine learning models may be used. The tone analysis component 318 may apply an acoustic model to detect positive tone (e.g., happy, cheerful, optimistic, calm, etc.) and negative tone (e.g., sad, angry, frustrated, disappointed, pessimistic, annoyed, etc.). The tone analysis component 318 may measure the proportion of positive to negative tone in individual segments of the session determine whether the tone used in the individual segments is negative or positive. Additionally, the tone analysis component 318 may determine that the overall tone of the session is positive or negative by measuring the proportion of positive to negative tone in the individual segments of the session.

The emotion analysis component 322 may be configured to classify emotions expressed by a customer and a service representative during a session. In some aspects, the emotion analysis component 322 may be configured to analyze a vector representation of each recording using the extracted features such as tone, which can indicate a level of arousal or excitement. The level of arousal relative to valence may be indicative of emotion expressed (e.g., joy, sadness, anger, surprise, calm, frustration, etc.). The emotion analysis component 322 may be given a collection of speech recordings, manually labeled with the emotions expressed to train a machine learning model configured to detect emotions. Different emotions may be associated with a score. For example, positive emotions may be given a positive score and negative emotions may be given a negative score. Emotion scores for individual segments are calculated, then the emotion scores for the individual segments are averaged to determine an overall emotion score for the session.

The sentiment analysis component 314 may be configured to recognize sentiment by calculating a sentiment score. The sentiment analysis component 314 may utilize extraction algorithms to extract features such as word content from the transcript 116 or the audio information 118 and train a machine-learning algorithm to recognize positive and negative texts. The sentiment analysis component 314 may apply an ML trained model to identify positive words and negative words. In one example, the sentiment analysis component 314 may calculate the sentiment score by identifying a number of positive words and a number of negative words, divided by a total number of words spoken words during a support session. The sentiment analysis component 314 may also define a threshold value as the average sentiment score. Subsequently, the sentiment analysis component 314 may determine that the overall sentiment of the session is positive if the sentiment score is above the threshold value. Conversely, the sentiment analysis component 314 may determine that the overall sentiment of the session is negative if the sentiment score is below the threshold value. Additionally, or alternatively, the sentiment analysis component 314 may define a range in which a sentiment score that falls within the range can be classified as neutral. In some aspects, the polarity of a word is context-dependent. In this regard, the sentiment analysis component 314 may utilize extracted features such as tone and characteristics such as emotion to determine whether the sentiment is positive or negative.

The active listening evaluation engine 120 may determine whether the plurality of active listening factor scores is indicative of active listening evaluation engine 120. The active listening evaluation engine 120 may analyze the word content of the transcript 116 or the audio information 118 to determine whether a customer service representative demonstrates active listening. In some aspects, the active listening evaluation engine 120 may implement extraction algorithms to identify words indicative of active listening. For example, the active listening evaluation engine 120 may identify paragraphing, restating questions, and/or reflecting by matching words spoken by the customer service representative to words spoken by the subscriber immediately preceding the customer service representative. Additionally, the active listening evaluation engine 120 may identify interruptions points during a conversation or a dialogue, which can indicate a lack of active listening.

The active listening evaluation engine 120 can comprise active listening evaluation models 324. The active listening evaluation engine 120 may be given a collection of training data that emulates data collected from the CC log 110 and/or the customer support terminal 104 and optionally a set of desired outputs (e.g., active listening factor scores, session scores, etc.) for the training data. In one example, the training data may include word content and other features such as tone. The active listening evaluation engine 120 may pinpoint features in the training data. For example, the active listening evaluation engine 120 may determine the significant properties and relationships of the input data that aid a model to distinguish between different classes of data. In some aspects, the active listening evaluation engine 120 may perform outlier detection analysis, feature composition analysis, and feature relevance analysis. In the outlier detection analysis, the active listening evaluation engine 120 may detect outlier features for exclusion from use in the generation of an active listening evaluation model 324. In various embodiments, the outlier detection analysis may be performed using a clustering algorithm.

In the feature composition analysis, the active listening evaluation engine 120 may transform at least some of the multiple features in the training data into a single feature. Accordingly, feature composition may decrease the number of input features while preserving the characteristics of the features. This decrease in the number of features may reduce the noise in the training corpus. As a result, the composition feature that is derived from the multiple features may improve the classification results for the datasets of the training corpus. In various implementations, the feature composition analysis may be performed using various dimensionality reduction algorithms, such as a Singular Value Decomposition (SVD) algorithm, a Principal Component Analysis (PCA) algorithm, a statistics algorithm, or another type of dimensionality reduction algorithm.

In the feature relevance analysis, the active listening evaluation engine 120 may identify redundant features in the training data to eliminate such features from being used in the training of the machine learning model. In various implementations, the feature relevance analysis may be performed using a dimensionality reduction algorithm (e.g., SVD algorithm, PCA algorithm, a statistics algorithm, and/ or so forth). The statistics algorithm may be a summary statistics algorithm, a correlation algorithm, a stratified sampling algorithm, and/or so forth.

The active listening evaluation engine 120 may select an initial type of machine learning algorithm to train an active listening evaluation model 324 using training data. Following the application of a selected machine learning algorithm to the training data, the active listening evaluation engine 120 may determine a training error measurement of the active listening evaluation model 324. The training error measurement may indicate the accuracy of the active listening evaluation model 324 in determining whether active listening is detected. Accordingly, if the training error measurement exceeds a training error threshold, the active listening evaluation engine 120 may select an additional type of machine learning algorithm. The training error threshold may be a stabilized error value that is greater than zero. The different types of machine learning algorithms may include a Bayesian algorithm, a decision tree algorithm, an SVM algorithm, an ensemble of trees algorithm (e.g., random forests and gradient-boosted trees), an isotonic regression algorithm, and/or so forth. Following the selection of the additional type of machine learning algorithm, the active listening evaluation engine 120 may execute the additional type of machine learning algorithm on the training corpus to generate training results and to augment the machine learning model with additional training results until the training error measurement is at or below the training error threshold.

The business logic 122 includes policies 326, scoring models 328, and knowledge objects 330. The policies 326 may define one or more predefined rules or protocols of the telecommunications service providers. In one example, the policies 326 may define predefined rules for escalating or resolving customer support requests. In another example, the policies 326 may define predefined rules for providing training to customer service representatives based on scoring models 328. The scoring models 328 comprise scores (e.g., active listening factor scores) that are calculated based on weight and can form the basis for a conclusion such as whether a customer service representative demonstrated active listening. The scoring models 328 may be based at least on a scorecard. The scorecard may be a table in which all factors that determine the presence of active listening are separated by characteristics, each with its weighted value. The various individual characteristics can, therefore, have varying influences on the presence of active listening. The knowledge objects 330 may include a database of working solutions that are used by customer service representatives to resolve customer service requests and other service issues.

The active listening evaluation engine 120 may provide support suggestions based on one or more scores (e.g., active listening factor scores, session scores), policies 326, and/or knowledge objects 330. The support suggestions may correlate to predetermined ranges of scores, policies 326, and/or knowledge objects 330. The support suggestions may be stored in a data store. In one example, a session score below a predetermined threshold may indicate that a customer service representative is not demonstrating active listening and the session score may correspond to suggestions reminding the customer service representative to actively listen. In another example, one or more policies 326 may correspond to suggestions related to offering discounts or crediting accounts. Similarly, one or more knowledge objects 330 may correspond to suggestions related to offering one or more solutions to resolve customer service requests. Therefore, to increase customer satisfaction, a score indicating lack of active listening together with policies 326 enabling a customer service representative to offer discounts and knowledge objects 330 offering a repair may provide suggestions to listen more closely to a subscriber and offer a technical support at a discounted rate.

Example Processes

Figure 4:
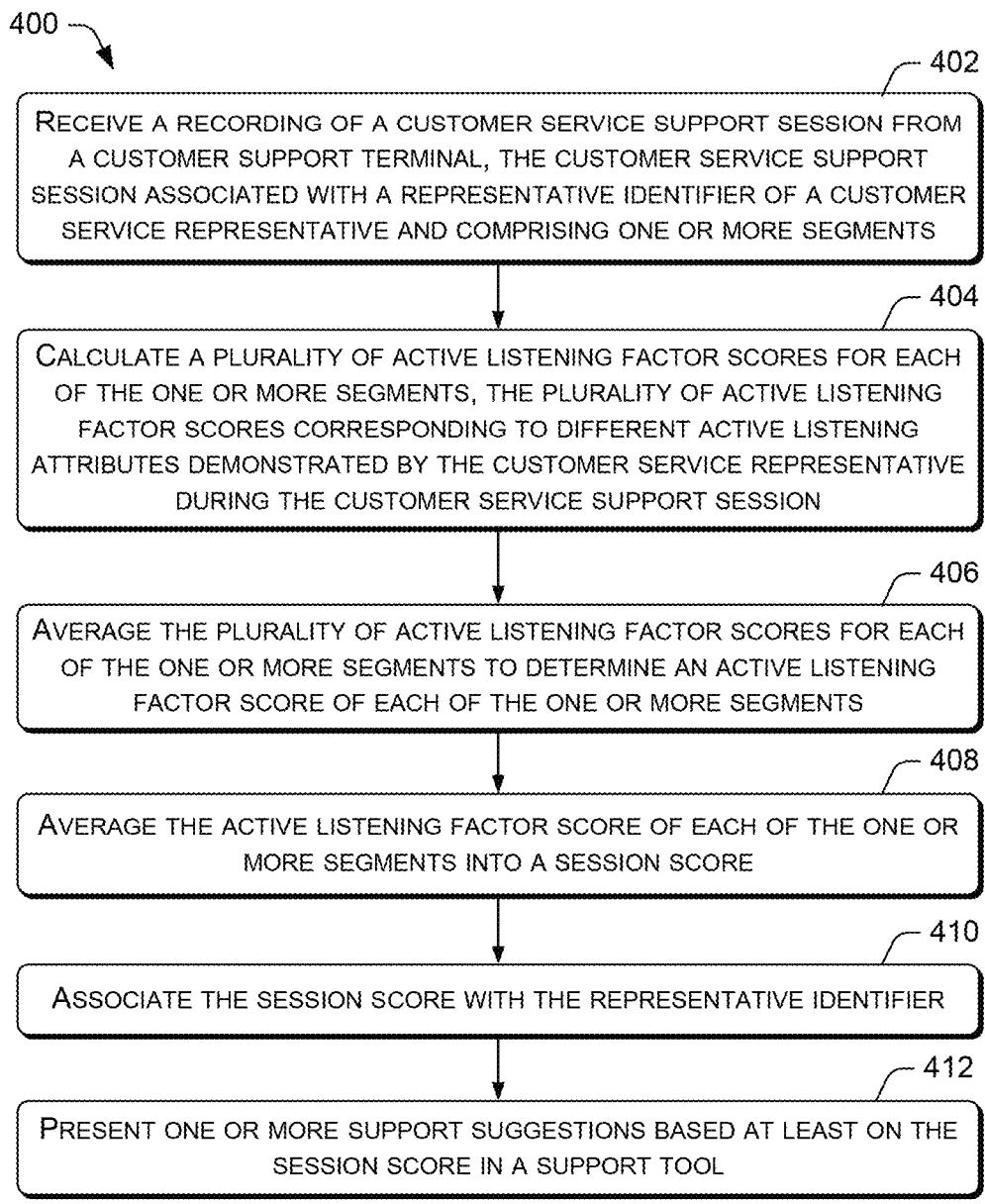
FIG. 4 is a flow diagram of an example process for evaluating active listening demonstrated by a customer service representative during a customer support session.
Figure 5:
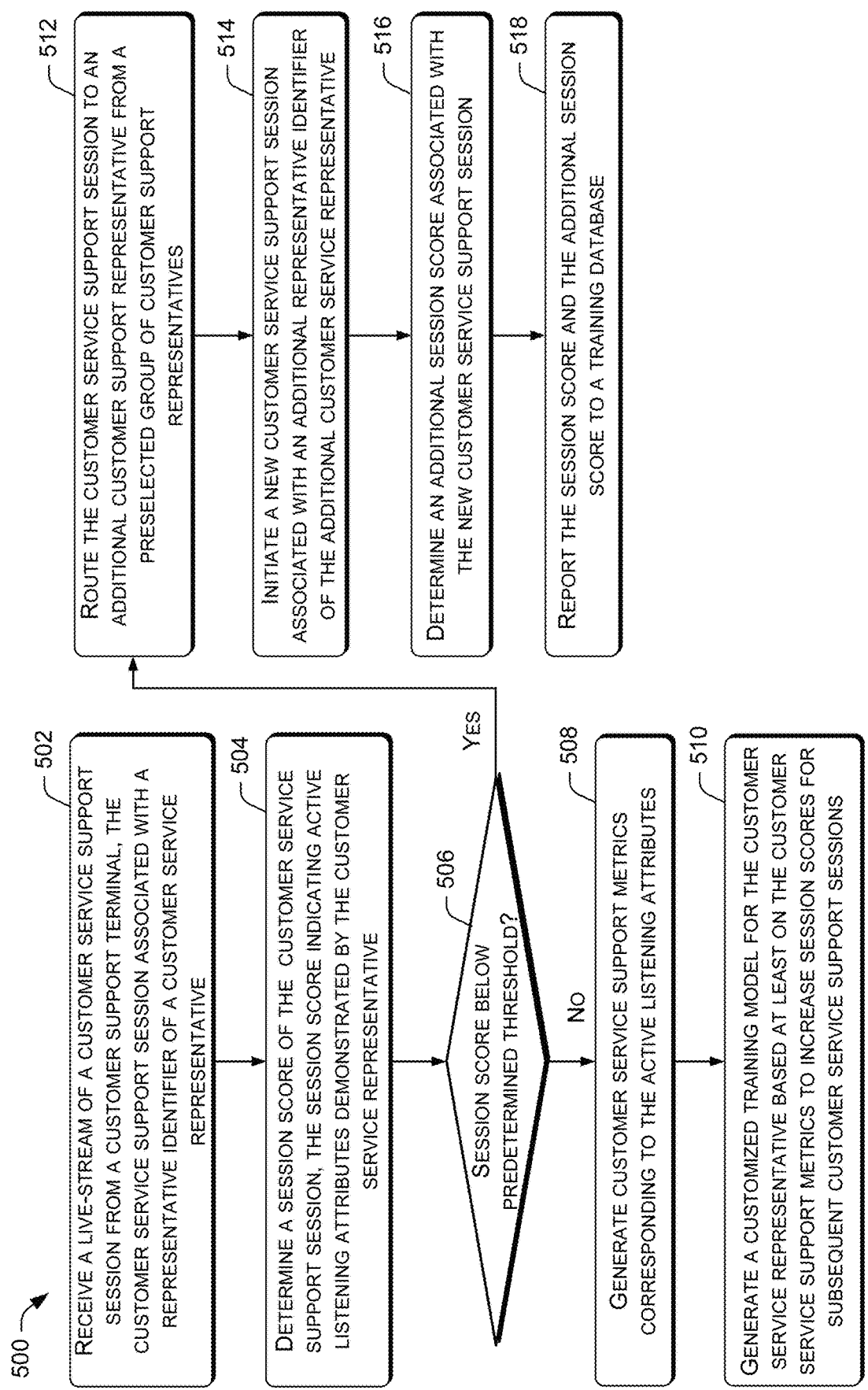
FIG. 5 is a flow diagram of an example process for initiating an additional customer support session based on the evaluation of active listening demonstrated by a customer service representative from a previous customer support session.

FIGS. 4 and 5 present illustrative processes 400-500 for evaluating active listening demonstrated by a customer service representative during a customer support session. The processes 400-500 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 are described with reference to FIGS. 1-3.

FIG. 4 is a flow diagram of an example process for evaluating active listening demonstrated by a customer service representative during a customer support session. At block 402, the active listening evaluation engine receives a recording of a customer service support session from a customer support terminal. The customer support terminal is associated with a representative identifier of a customer service representative. The recording may include a transcript or audio information. The customer service support session comprises one or more segments. At block 404, the active listening evaluation engine calculates a plurality of active listening factor scores for each of the one or more segments. The plurality of active listening factor scores corresponds to different active listening attributes demonstrated by the customer service representative during the customer service support session. The active listening attributes are partially based on active listening data in the recording. The active listening evaluation engine may process the active listening data to generate customer service support metrics corresponding to the different active listening attributes and generate a customized training model for the customer service representative to increase session scores of subsequent customer service support sessions. For example, the training model may be configured to enhance one or more skills in active listening such as the ability to show empathy or to improve identification of issues by paraphrasing a problem.

At block 406, the active listening evaluation engine averages the plurality of active listening factor scores for each of the one or more segments to determine an active listening factor score (i.e., a segment score) of the one or more segments. At block 408, the active listening evaluation engine averages the active listening factor score of each of the one or more segments into a session score. At block 410, the active listening evaluation engine associates the session score with the representative identifier. At block 412, the active listening evaluation engine presents one or more support suggestions based at least on the session score of the customer service representative in a support tool. In one example, one or more suggestions may correspond to predetermined ranges of session scores. If a session score is below a predetermined threshold, the score may indicate that the customer service representative is not performing active listening and the suggestions may be directed to increasing active listening. For instance, the active listening evaluation engine may prompt the customer service representative to restate a subscriber's question. Conversely, if a session score is above a predetermined threshold, the score may indicate that the customer service representative is performing active listening and the suggestions may be directed to continue performing active listening. In another example, suggestions may be made based on marketing campaigns or promotions. If the session score is below a predetermined threshold, the score may indicate that the customer service representative is not performing active listening and not providing a quality customer service. Thus, the suggestions may include offering a discount to increase the quality of customer service and customer satisfaction. Upon terminating the support session, the customer service representative may generate session notes for the customer service support session. The session notes can include the session score. The session notes may be associated with a subscriber identifier of a subscriber and stored in a subscriber database.

In another example, if the session score is below a predetermined threshold, the active listening evaluation engine may transfer the customer service support session to an additional customer service representative. If the customer service representative receives a request for an additional customer service support session from the subscriber, the active listening evaluation engine may retrieve the session notes from the subscriber database and identify the session score associated with the customer service support session. Based at least on the session score, the active listening evaluation engine may determine whether the subscriber satisfies one or more conditions, the one or more conditions including that the session score is below a predetermined threshold. In response to making a determination that the subscriber satisfies a condition of the one or more conditions, the active listening evaluation engine may designate an additional customer service representative from a preselected group of customer service representatives for the additional customer service support session to assist the subscriber.

FIG. 5 is a flow diagram of an example process for initiating an additional customer support session based on the evaluation of active listening demonstrated by a customer service representative from a previous customer support session. At block 502, the active listening evaluation engine receives a live-stream of a customer service support session from a customer support terminal. The customer service support session is associated with a representative identifier of a customer service representative. At block 504, the active listening evaluation engine determines a session score associated with the customer service support session. The session score indicates active listening attributes demonstrated by the customer service representative. At decision block 506, the active listening evaluation engine determines whether the session score is below a predetermined threshold. If the session score is not below the predetermined threshold ("no" response from the decision block 506), the active listening evaluation engine generates customer service support metrics corresponding to the active listening attributes as indicated in block 508. At block 510, the active listening evaluation engine generates a customized training model for the customer service representative based at least on the customer service support metrics to increase session scores for subsequent customer service support sessions.

If the session score is below the predetermined threshold ("yes" response from the decision block 508), the active listening evaluation engine routes the customer service support session to an additional customer support representative, as indicated in block 512. The additional customer support representative may be a member of a preselected group of customer support representatives. At block 514, the active listening evaluation engine initiates a new customer service support session. The new customer service support session is associated with an additional representative identifier of the additional customer service representative. At block 516, the active listening evaluation engine determines that an additional session score is associated with the new customer service support session. The additional session score indicates the active listening attributes demonstrated by the additional customer service representative. At block 518, the active listening evaluation engine reports the session score associated with the customer service support session and the additional session score associated with the new customer service support session to a training database.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
  receiving a recording of a customer service support session from a customer support terminal, the customer support terminal associated with a representative identifier of a customer service representative, the customer service support session comprising multiple segments of the recording;
  training machine learning models based at least on training data to produce trained machine-learning models that generate active listening factor scores for a plurality of active listening attributes included in segments of recordings;
  applying the trained machine learning models to the multiple segments of the recording to calculate a plurality of active listening factor scores for each of the multiple segments of the recording, the plurality of active listening factor scores corresponding to different active listening attributes demonstrated by the customer service representative during the customer service support session;
  averaging the plurality of active listening factor scores to determine an active listening factor score for each of the multiple segments of the recording;
  averaging active listening factor scores of the multiple segments of the recording into a session score;
  associating the session score with the representative identifier; and
  presenting one or more support suggestions based at least on the session score of the customer service representative in a support tool.

2. The one or more non-transitory computer-readable media of claim 1, wherein the active listening attributes are partially based on active listening data.

3. The one or more non-transitory computer-readable media of claim 1, wherein the acts further comprise:

transferring the customer service support session to an additional customer service representative based at least on the session score.

4. The one or more non-transitory computer-readable media of claim 1, wherein the acts further comprise:
processing the active listening data to generate customer service support metrics corresponding to the different active listening attributes; and
generating a customized training model for the customer service representative to increase session scores of subsequent customer service support sessions.

5. The one or more non-transitory computer-readable media of claim 1, wherein the acts further comprise:
generating session notes for the customer service support session, the session notes including the session score;
associating the session notes with a subscriber identifier of a subscriber; and
storing the session notes in a subscriber database.

6. The one or more non-transitory computer-readable media of claim 5, wherein the acts further comprise:
receiving a request for an additional customer service support session from the subscriber;
retrieving the session notes from the subscriber database;
identifying the session score associated with the customer service support session;
determining based at least on the session score, whether the subscriber satisfies one or more conditions, the one or more conditions including that the session score is below a predetermined threshold; and
designating an additional customer service representative from a preselected group of customer service representatives for the additional customer service support session to assist the subscriber in response to making a determination that the subscriber satisfies a condition of the one or more conditions.

7. The one or more non-transitory computer-readable media of claim 1, wherein the one or more service support suggestions are based at least on marketing campaigns.

8. A computer-implemented method, comprising:
receiving a live-stream of a customer service support session from a customer support terminal, the customer support terminal associated with a representative identifier of a customer service representative, the customer service support session comprising multiple segments of the live-stream;
training machine learning models based at least on training data to produce trained machine-learning models that generate active listening factor scores for a plurality of active listening attributes included in segments of live-streams;
applying the trained machine learning models to the multiple segments of the live-stream to calculate a plurality of active listening factor scores for each of the multiple segments of the live-stream, the plurality of active listening factor scores corresponding to different active listening attributes demonstrated by the customer service representative during the customer service support session;
averaging the plurality of active listening factor scores to determine an active listening factor score for each of the multiple segments of the live-stream;
averaging active listening factor scores of the multiple segments of the live-stream into a session score;
associating the session score with the representative identifier; and
presenting one or more support suggestions based at least on the session score of the customer service representative in a support tool.

9. The computer-implemented method of claim 8, further comprising:
identifying triggering events based at least on the active listening attributes demonstrated by the customer service representative to provide the one or more support suggestions during the customer service support session.

10. The computer-implemented method of claim 8, wherein the active listening attributes are partially based on active listening data.

11. The computer-implemented method of claim 8, further comprising:
transferring the customer service support session to an additional customer service representative based at least on the session score.

12. The computer-implemented method of claim 10, further comprising the steps of:
processing the active listening data to generate customer service support metrics corresponding to the different active listening attributes; and
generating a customized training model for the customer service representative to increase session scores of subsequent customer service support sessions.

13. The computer-implemented method of claim 8, further comprising:
generating session notes for the customer service support session, the session notes including the session score;
associating the session notes with a subscriber identifier of a subscriber; and
storing the session notes in a subscriber database.

14. The computer-implemented method of claim 13, further comprising the steps of:
receiving a request for an additional customer service support session from the subscriber;
retrieving the session notes from the subscriber database;
identifying the session score associated with the customer service support session;
determining based at least on the session score, whether the subscriber satisfies one or more conditions, the one or more conditions including that the session score is below a predetermined threshold; and
designating an additional customer service representative from a preselected group of customer service representatives for the additional customer service support session to assist the subscriber in response to making a determination that the subscriber satisfies a condition of the one or more conditions.

15. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
receive a live-stream of a customer service support session from a customer support terminal, the customer support terminal associated with a representative identifier of a customer service representative, the customer service support session comprising multiple segments of the live-stream;
train machine learning models based at least on training data to produce trained machine-learning models that generate active listening factor scores for a plurality of active listening attributes included in segments of live-streams;

apply the trained machine learning models to the multiple segments of the live-stream to calculate a plurality of active listening factor scores for each of the multiple segments of the live-stream, the plurality of active listening factor scores corresponding to different active listening attributes demonstrated by the customer service representative during the customer service support session;

average the plurality of active listening factor scores to determine an active listening factor score for each of the multiple segments of the live-stream;

average the active listening factor scores of the multiple segments of the live-stream into a session score;

associate the session score with the representative identifier; and present one or more support suggestions based at least on the session score of the customer service representative in a support tool.

16. The system of claim 15, wherein the one or more processors is further configured to:

identify triggering events based at least on the active listening attributes demonstrated by the customer service representative to display prompts on a user interface of the support tool during the customer service support session.

17. The system of claim 15, wherein the one or more processors is further configured to:

transfer the customer service support session to an additional customer service representative based at least on the session score.

18. The system of claim 15, wherein the one or more processors is further configured to:

process active listening data that includes the different active listing attributes to generate customer service support metrics corresponding to the different active listening attributes; and generate a customized training model for the customer service representative to increase session scores of subsequent customer service support sessions.

19. The system of claim 15, wherein the one or more processors is further configured to:

generate session notes for the customer service support session, the session notes including the session score;

associate the session notes with a subscriber identifier of a subscriber; and store the session notes in a subscriber database.

20. The system of claim 19, wherein the one or more processors is further configured to:

receive a request for an additional customer service support session from the subscriber;

retrieve the session notes from the subscriber database;

identify the session score associated with the customer service support session;

determine based at least on the session score, whether the subscriber satisfies one or more conditions, the one or more conditions including that the session score is below a predetermined threshold; and designate an additional customer service representative from a preselected group of customer service representatives for the additional customer service support session to assist the subscriber in response to making a determination that the subscriber satisfies a condition of the one or more conditions.

\* \* \* \* \*